(12) United States Patent
Aggarwal et al.

(10) Patent No.: US 12,494,975 B2
(45) Date of Patent: Dec. 9, 2025

(54) APPARATUS, METHOD, AND COMPUTER PROGRAM

(71) Applicant: Nokia Technologies Oy, Espoo (FI)

(72) Inventors: Chaitanya Aggarwal, Munich (DE); Saurabh Khare, Bangalore (IN); Gerald Kunzmann, Munich (DE); Muhammad Majid Butt, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/292,267

(22) PCT Filed: Oct. 7, 2021

(86) PCT No.: PCT/IB2021/059210
§ 371 (c)(1),
(2) Date: Jan. 25, 2024

(87) PCT Pub. No.: WO2023/057797
PCT Pub. Date: Apr. 13, 2023

(65) Prior Publication Data
US 2025/0126030 A1    Apr. 17, 2025

(51) Int. Cl.
*H04L 41/5051* (2022.01)
*H04L 9/08* (2006.01)

(52) U.S. Cl.
CPC ........ *H04L 41/5051* (2013.01); *H04L 9/0861* (2013.01)

(58) Field of Classification Search
CPC ...... H04L 9/0861; H04W 48/16; H04W 12/08
See application file for complete search history.

(56) References Cited

U.S. PATENT DOCUMENTS

| | | | | |
|---|---|---|---|---|
| 11,397,804 B2* | 7/2022 | Kirkeby | ............. | H04L 9/3247 |
| 11,423,454 B2* | 8/2022 | Addepalli | ............. | G06F 21/121 |
| 11,526,471 B2* | 12/2022 | Lisuk | ............. | G06N 7/00 |
| 12,200,810 B2* | 1/2025 | Hu | ............. | H04W 28/0284 |
| 2020/0134067 A1* | 4/2020 | Villard | ............. | G06F 16/243 |

(Continued)

OTHER PUBLICATIONS

3GPP (NPL, 3GPP TS 33.501 V17.3.0 (Sep. 2021)) Technical Specification Group Services and System Aspects; Security Architecture and Procedures for 5G System (Release 17) (Year: 2021).*

(Continued)

*Primary Examiner* — Alex Tran
(74) *Attorney, Agent, or Firm* — Barta Jones, PLLC

(57) ABSTRACT

The disclosure relates to an apparatus comprising at least one processor and at least one memory including computer code for one or more programs, the at least one memory and the computer code configured, with the at least one processor, to cause the apparatus at least to: receive (500), from a model provider function, a user equipment identifier and a model identifier; generate (502) an access key to allow a user equipment identified by the user equipment identifier to access a model identified by the model identifier; store (504) the user equipment identifier and the model identifier along the access key to allow a user equipment identified by the user equipment identifier to access a model identified by the model identifier; and send (506), to the user equipment, the access key.

3 Claims, 12 Drawing Sheets

---

900 UDM or UDR may receive, from an AF for model subscription service, a UE ID and a model ID

902 UDM or UDR may discover a model provider function providing the model identified by the model ID

904 UDM or UDR may send, to the model provider function, the UE ID, and the model ID

(56) References Cited

U.S. PATENT DOCUMENTS

| | | | |
|---|---|---|---|
| 2022/0108214 A1* | 4/2022 | Lee | G06N 20/20 |
| 2023/0336969 A1* | 10/2023 | Muñoz De La Torre Alonso | H04W 24/08 |
| 2024/0380744 A1* | 11/2024 | Comak | H04L 63/0807 |

OTHER PUBLICATIONS

"3rd Generation Partnership Project; Technical Specification Group Services and System Aspects; Security architecture and procedures for 5G system (Release 17)", 3GPP TS 33.501, V17.2.1, Jun. 2021, pp. 1-257.

"3rd Generation Partnership Project; Technical Specification Group Services and System Aspects; Study on traffic characteristics and performance requirements for AI/ML model transfer in 5GS (Release 18)", 3GPP TR 22.874, V18.0.1, Jun. 2021, pp. 1-111.

International Search Report and Written Opinion received for corresponding Patent Cooperation Treaty Application No. PCT/IB2021/059210, dated Jun. 20, 2022, 15 pages.

"3rd Generation Partnership Project; Technical Specification Group Services and System Aspects; Architecture enhancements for 5G System (5GS) to support network data analytics services (Release 17)", 3GPP TS 23.288, V17.2.0, Sep. 2021, pp. 1-196.

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1-382.

"3rd Generation Partnership Project; Technical Specification Group Services and System Aspects; Study on security aspects of enablers for Network Automation (eNA) for the 5G system (5GS) Phase 2; (Release 17)", 3GPP TR 33.866, V0.6.0, Aug. 2021, pp. 1-48.

* cited by examiner

1000 Model provider function may send, to a DMRF, a UE ID and a model ID

Fig. 10

APPARATUS, METHOD, AND COMPUTER PROGRAM

RELATED APPLICATION

This application claims priority to PCT Application No. PCT/IB2021/059210, filed on Oct. 7, 2021, which is incorporated herein by reference in its entirety.

FIELD OF THE DISCLOSURE

The present disclosure relates to an apparatus, a method, and a computer program for allowing a user equipment to access a model (e.g. an artificial intelligence or machine learning model) in a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising means for: receiving, from a model provider function, a user equipment identifier and a model identifier; generating an access key to allow a user equipment identified by the user equipment identifier to access a model identified by the model identifier; storing the user equipment identifier and the model identifier along the access key to allow a user equipment identified by the user equipment identifier to access a model identified by the model identifier; and sending, to the user equipment, the access key.

The apparatus may comprise means for: storing the user equipment identifier and the model identifier further along at least one of an access key expiry time, a model version identifier, a user equipment subscription status, an application function for model uploading service identifier or an address of an application function for model uploading service.

The apparatus may comprise means for: receiving, from the model provider function, the model version identifier.

The apparatus may comprise means for: receiving, from the model provider function, the application function for model uploading service identifier and/or the address of the application function for model uploading service.

The apparatus may comprise means for: determining the application function for model uploading service identifier and/or the address of the application function for model uploading service; and sending, to the model provider function, the application function for model uploading service identifier and/or the address of the application function for model uploading service.

The apparatus may comprise means for: sending, to the user equipment, the application function for model uploading service identifier and/or the address of the application function for model uploading service.

The apparatus may comprise means for: sending, to the model provider function, a request to be notified when a model update is available at the model provider function; receiving, from the model provider function, a notification when a model update is available at the model provider function; and sending, to the model provider function, a request to upload the model update to the application function for model uploading service.

The apparatus may comprise means for: storing a blocklist of user equipment.

The apparatus may comprise means for: receiving, from the application function for model uploading service, a request to verify a user equipment identifier, a model identifier and an access key; verifying that the user equipment identifier and the model identifier are stored along the access key, that the user equipment identifier is not part of the blocklist of user equipment and/or that the access key expiry time has not expired; and sending, to the application function for model uploading service, an indication of successful verification or unsuccessful verification.

According to an aspect there is provided an apparatus comprising at least one processor and at least one memory including computer code for one or more programs, the at least one memory and the computer code configured, with the at least one processor, to cause the apparatus at least to: receive, from a model provider function, a user equipment identifier and a model identifier; generate an access key to allow a user equipment identified by the user equipment identifier to access a model identified by the model identifier; store the user equipment identifier and the model identifier along the access key to allow a user equipment identified by the user equipment identifier to access a model identified by the model identifier; and send, to the user equipment, the access key.

The at least one memory and the computer code may be configured, with the at least one processor, to cause the apparatus at least to: store the user equipment identifier and the model identifier further along at least one of an access key expiry time, a model version identifier, a user equipment subscription status, an application function for model uploading service identifier or an address of an application function for model uploading service.

The at least one memory and the computer code may be configured, with the at least one processor, to cause the apparatus at least to: receive, from the model provider function, the model version identifier.

The at least one memory and the computer code may be configured, with the at least one processor, to cause the apparatus at least to: receive, from the model provider function, the application function for model uploading service identifier and/or the address of the application function for model uploading service.

The at least one memory and the computer code may be configured, with the at least one processor, to cause the apparatus at least to: determine the application function for model uploading service identifier and/or the address of the application function for model uploading service; and send, to the model provider function, the application function for model uploading service identifier and/or the address of the application function for model uploading service.

The at least one memory and the computer code may be configured, with the at least one processor, to cause the apparatus at least to: send, to the user equipment, the application function for model uploading service identifier and/or the address of the application function for model uploading service.

The at least one memory and the computer code may be configured, with the at least one processor, to cause the apparatus at least to: send, to the model provider function, a request to be notified when a model update is available at the model provider function; receive, from the model provider function, a notification when a model update is available at the model provider function; and send, to the model provider function, a request to upload the model update to the application function for model uploading service.

The at least one memory and the computer code may be configured, with the at least one processor, to cause the apparatus at least to: store a blocklist of user equipment.

The at least one memory and the computer code may be configured, with the at least one processor, to cause the apparatus at least to: receive, from the application function for model uploading service, a request to verify a user equipment identifier, a model identifier and an access key; verify that the user equipment identifier and the model identifier are stored along the access key, that the user equipment identifier is not part of the blocklist of user equipment and/or that the access key expiry time has not expired; and send, to the application function for model uploading service, an indication of successful verification or unsuccessful verification.

According to an aspect there is provided an apparatus comprising circuitry configured to: receive, from a model provider function, a user equipment identifier and a model identifier; generate an access key to allow a user equipment identified by the user equipment identifier to access a model identified by the model identifier; store the user equipment identifier and the model identifier along the access key to allow a user equipment identified by the user equipment identifier to access a model identified by the model identifier; and send, to the user equipment, the access key.

The apparatus may comprise circuitry configured to: store the user equipment identifier and the model identifier further along at least one of an access key expiry time, a model version identifier, a user equipment subscription status, an application function for model uploading service identifier or an address of an application function for model uploading service.

The apparatus may comprise circuitry configured to: receive, from the model provider function, the model version identifier.

The apparatus may comprise circuitry configured to: receive, from the model provider function, the application function for model uploading service identifier and/or the address of the application function for model uploading service.

The apparatus may comprise circuitry configured to: determine the application function for model uploading service identifier and/or the address of the application function for model uploading service; and send, to the model provider function, the application function for model uploading service identifier and/or the address of the application function for model uploading service.

The apparatus may comprise circuitry configured to: send, to the user equipment, the application function for model uploading service identifier and/or the address of the application function for model uploading service.

The apparatus may comprise circuitry configured to: send, to the model provider function, a request to be notified when a model update is available at the model provider function; receive, from the model provider function, a notification when a model update is available at the model provider function; and send, to the model provider function, a request to upload the model update to the application function for model uploading service.

The apparatus may comprise circuitry configured to: store a blocklist of user equipment.

The apparatus may comprise circuitry configured to: receive, from the application function for model uploading service, a request to verify a user equipment identifier, a model identifier and an access key; verify that the user equipment identifier and the model identifier are stored along the access key, that the user equipment identifier is not part of the blocklist of user equipment and/or that the access key expiry time has not expired; and send, to the application function for model uploading service, an indication of successful verification or unsuccessful verification.

According to an aspect there is provided a method comprising: receiving, from a model provider function, a user equipment identifier and a model identifier; generating an access key to allow a user equipment identified by the user equipment identifier to access a model identified by the model identifier; storing the user equipment identifier and the model identifier along the access key to allow a user equipment identified by the user equipment identifier to access a model identified by the model identifier; and sending, to the user equipment, the access key.

The method may comprise: storing the user equipment identifier and the model identifier further along at least one of an access key expiry time, a model version identifier, a user equipment subscription status, an application function for model uploading service identifier or an address of an application function for model uploading service.

The method may comprise: receiving, from the model provider function, the model version identifier.

The method may comprise: receiving, from the model provider function, the application function for model uploading service identifier and/or the address of the application function for model uploading service.

The method may comprise: determining the application function for model uploading service identifier and/or the address of the application function for model uploading service; and sending, to the model provider function, the application function for model uploading service identifier and/or the address of the application function for model uploading service.

The method may comprise: sending, to the user equipment, the application function for model uploading service identifier and/or the address of the application function for model uploading service.

The method may comprise: sending, to the model provider function, a request to be notified when a model update is available at the model provider function; receiving, from the model provider function, a notification when a model update is available at the model provider function; and sending, to the model provider function, a request to upload the model update to the application function for model uploading service.

The method may comprise: storing a blocklist of user equipment.

The method may comprise: receiving, from the application function for model uploading service, a request to verify a user equipment identifier, a model identifier and an access key; verifying that the user equipment identifier and the model identifier are stored along the access key, that the user equipment identifier is not part of the blocklist of user equipment and/or that the access key expiry time has not expired; and sending, to the application function for model uploading service, an indication of successful verification or unsuccessful verification.

According to an aspect there is provided a computer program comprising computer executable code which when run on at least one processor is configured to: receive, from a model provider function, a user equipment identifier and a model identifier; generate an access key to allow a user equipment identified by the user equipment identifier to access a model identified by the model identifier; store the user equipment identifier and the model identifier along the access key to allow a user equipment identified by the user equipment identifier to access a model identified by the model identifier; and send, to the user equipment, the access key.

The computer program may comprise computer executable code which when run on at least one processor is configured to: store the user equipment identifier and the model identifier further along at least one of an access key expiry time, a model version identifier, a user equipment subscription status, an application function for model uploading service identifier or an address of an application function for model uploading service.

The computer program may comprise computer executable code which when run on at least one processor is configured to: receive, from the model provider function, the model version identifier.

The computer program may comprise computer executable code which when run on at least one processor is configured to: receive, from the model provider function, the application function for model uploading service identifier and/or the address of the application function for model uploading service.

The computer program may comprise computer executable code which when run on at least one processor is configured to: determine the application function for model uploading service identifier and/or the address of the application function for model uploading service; and send, to the model provider function, the application function for model uploading service identifier and/or the address of the application function for model uploading service.

The computer program may comprise computer executable code which when run on at least one processor is configured to: send, to the user equipment, the application function for model uploading service identifier and/or the address of the application function for model uploading service.

The computer program may comprise computer executable code which when run on at least one processor is configured to: send, to the model provider function, a request to be notified when a model update is available at the model provider function; receive, from the model provider function, a notification when a model update is available at the model provider function; and send, to the model provider function, a request to upload the model update to the application function for model uploading service.

The computer program may comprise computer executable code which when run on at least one processor is configured to: store a blocklist of user equipment.

The computer program may comprise computer executable code which when run on at least one processor is configured to: receive, from the application function for model uploading service, a request to verify a user equipment identifier, a model identifier and an access key; verify that the user equipment identifier and the model identifier are stored along the access key, that the user equipment identifier is not part of the blocklist of user equipment and/or that the access key expiry time has not expired; and send, to the application function for model uploading service, an indication of successful verification or unsuccessful verification.

According to an aspect there is provided an apparatus comprising means for: receiving, from a user equipment, a request to access a model comprising a user equipment identifier, a model identifier and an access key to allow the user equipment identified by the user equipment identifier to access a model identified by the model identifier; sending, to a data model repository function, a request to verify the user equipment identifier, the model identifier and the access key; and receiving, from the data model repository function, an indication of successful verification or unsuccessful verification.

The apparatus may means for: receiving, from the data model repository function, an indication of successful verification; and send, to the user equipment, the model.

According to an aspect there is provided an apparatus comprising at least one processor and at least one memory including computer code for one or more programs, the at least one memory and the computer code configured, with the at least one processor, to cause the apparatus at least to: receive, from a user equipment, a request to access a model comprising a user equipment identifier, a model identifier and an access key to allow the user equipment identified by the user equipment identifier to access a model identified by the model identifier; send, to a data model repository function, a request to verify the user equipment identifier, the model identifier and the access key; and receive, from the data model repository function, an indication of successful verification or unsuccessful verification.

The at least one memory and the computer code may be configured, with the at least one processor, to cause the apparatus at least to: receive, from the data model repository function, an indication of successful verification; and send, to the user equipment, the model.

According to an aspect there is provided an apparatus comprising circuitry configured to: receive, from a user equipment, a request to access a model comprising a user equipment identifier, a model identifier and an access key to allow the user equipment identified by the user equipment identifier to access a model identified by the model identifier; send, to a data model repository function, a request to verify the user equipment identifier, the model identifier and the access key; and receive, from the data model repository function, an indication of successful verification or unsuccessful verification.

The apparatus may comprise circuitry configured to: receive, from the data model repository function, an indication of successful verification; and send, to the user equipment, the model.

According to an aspect there is provided a method comprising: receiving, from a user equipment, a request to access a model comprising a user equipment identifier, a model identifier and an access key to allow the user equipment identified by the user equipment identifier to access a model identified by the model identifier; sending, to a data model repository function, a request to verify the user equipment identifier, the model identifier and the access key;

and receiving, from the data model repository function, an indication of successful verification or unsuccessful verification.

The method may comprise: receiving, from the data model repository function, an indication of successful verification; and send, to the user equipment, the model.

According to an aspect there is provided a computer program comprising computer executable code which when run on at least one processor is configured to: receive, from a user equipment, a request to access a model comprising a user equipment identifier, a model identifier and an access key to allow the user equipment identified by the user equipment identifier to access a model identified by the model identifier; send, to a data model repository function, a request to verify the user equipment identifier, the model identifier and the access key; and receive, from the data model repository function, an indication of successful verification or unsuccessful verification.

The computer program may comprise computer executable code which when run on at least one processor is configured to: receive, from the data model repository function, an indication of successful verification; and send, to the user equipment, the model.

According to an aspect there is provided an apparatus comprising means for: receiving, from a data model repository function, an address of an application function for model uploading service and an access key to allow a user equipment identified by a user equipment identifier to access a model identified by a model identifier; sending, to the application function for model uploading service, a request to access a model comprising the user equipment identifier, the model identifier and the access key; and receiving, from the application function for model uploading service, the model.

The apparatus may comprise means for: sending, to an application function for model subscription service, a request to obtain a subscription to access the model comprising the user equipment identifier and the model identifier.

According to an aspect there is provided an apparatus comprising at least one processor and at least one memory including computer code for one or more programs, the at least one memory and the computer code configured, with the at least one processor, to cause the apparatus at least to: receive, from a data model repository function, an address of an application function for model uploading service and an access key to allow a user equipment identified by a user equipment identifier to access a model identified by a model identifier; send, to the application function for model uploading service, a request to access a model comprising the user equipment identifier, the model identifier and the access key; and receive, from the application function for model uploading service, the model.

The at least one memory and the computer code may be configured, with the at least one processor, to cause the apparatus at least to: send, to an application function for model subscription service, a request to obtain a subscription to access the model comprising the user equipment identifier and the model identifier.

According to an aspect there is provided an apparatus comprising circuitry configured to: receive, from a data model repository function, an address of an application function for model uploading service and an access key to allow a user equipment identified by a user equipment identifier to access a model identified by a model identifier; send, to the application function for model uploading service, a request to access a model comprising the user equipment identifier, the model identifier and the access key; and receive, from the application function for model uploading service, the model.

The apparatus may comprise circuitry configured to: send, to an application function for model subscription service, a request to obtain a subscription to access the model comprising the user equipment identifier and the model identifier.

According to an aspect there is provided a method comprising: receiving, from a data model repository function, an address of an application function for model uploading service and an access key to allow a user equipment identified by a user equipment identifier to access a model identified by a model identifier; sending, to the application function for model uploading service, a request to access a model comprising the user equipment identifier, the model identifier and the access key; and receiving, from the application function for model uploading service, the model.

The method may comprise: sending, to an application function for model subscription service, a request to obtain a subscription to access the model comprising the user equipment identifier and the model identifier.

According to an aspect there is provided a computer program comprising computer executable code which when run on at least one processor is configured to receive, from a data model repository function, an address of an application function for model uploading service and an access key to allow a user equipment identified by a user equipment identifier to access a model identified by a model identifier; send, to the application function for model uploading service, a request to access a model comprising the user equipment identifier, the model identifier and the access key; and receive, from the application function for model uploading service, the model.

The computer program may comprise computer executable code which when run on at least one processor is configured to: send, to an application function for model subscription service, a request to obtain a subscription to access the model comprising the user equipment identifier and the model identifier.

According to an aspect there is provided an apparatus comprising means for: receiving, from a user equipment, a request to obtain a subscription to access a model comprising a user equipment identifier and a model identifier; and sending, to a unified data management or a unified data repository, the user equipment identifier and the model identifier.

According to an aspect there is provided an apparatus comprising at least one processor and at least one memory including computer code for one or more programs, the at least one memory and the computer code configured, with the at least one processor, to cause the apparatus at least to: receive, from a user equipment, a request to obtain a subscription to access a model comprising a user equipment identifier and a model identifier; and send, to a unified data management or a unified data repository, the user equipment identifier and the model identifier.

According to an aspect there is provided an apparatus comprising circuitry configured to: receive, from a user equipment, a request to obtain a subscription to access a model comprising a user equipment identifier and a model identifier; and send, to a unified data management or a unified data repository, the user equipment identifier and the model identifier.

According to an aspect there is provided a method comprising: receiving, from a user equipment, a request to obtain a subscription to access a model comprising a user equipment identifier and a model identifier; and sending, to a unified data management or a unified data repository, the user equipment identifier and the model identifier.

According to an aspect there is provided a computer program comprising computer executable code which when run on at least one processor is configured to: receive, from a user equipment, a request to obtain a subscription to access a model comprising a user equipment identifier and a model identifier; and send, to a unified data management or a unified data repository, the user equipment identifier and the model identifier.

According to an aspect there is provided an apparatus comprising means for: receiving, from an application function for model subscription service, a user equipment identifier and a model identifier; discovering a model provider function providing the model identified by the model identifier; and sending, to the model provider function, the user equipment identifier and the model identifier.

According to an aspect there is provided an apparatus comprising at least one processor and at least one memory including computer code for one or more programs, the at least one memory and the computer code configured, with the at least one processor, to cause the apparatus at least to: receive, from an application function for model subscription service, a user equipment identifier and a model identifier; discover a model provider function providing the model identified by the model identifier; and send, to the model provider function, the user equipment identifier and the model identifier.

According to an aspect there is provided an apparatus comprising circuitry configured to: receive, from an application function for model subscription service, a user equipment identifier and a model identifier; discover a model provider function providing the model identified by the model identifier; and send, to the model provider function, the user equipment identifier and the model identifier.

According to an aspect there is provided a method comprising: receiving, from an application function for model subscription service, a user equipment identifier and a model identifier; discovering a model provider function providing the model identified by the model identifier; and sending, to the model provider function, the user equipment identifier and the model identifier.

According to an aspect there is provided a computer program comprising computer executable code which when run on at least one processor is configured to: receive, from an application function for model subscription service, a user equipment identifier and a model identifier; discover a model provider function providing the model identified by the model identifier; and send, to the model provider function, the user equipment identifier and the model identifier.

According to an aspect there is provided an apparatus comprising means for: sending, to a data model repository function, a user equipment identifier and a model identifier.

The apparatus may comprise means for: uploading, to an application function for model uploading service, a model identified by the model identifier; and sending, to the data model repository function, a model version identifier, an application function for model uploading service identifier and/or an address of the application function for model uploading service.

The apparatus may comprise means for: receiving, from the data model repository function an application function for model uploading service identifier and/or an address of the application function for model uploading service; and uploading, to application function for model uploading service, a model identified by the model identifier.

According to an aspect there is provided an apparatus comprising at least one processor and at least one memory including computer code for one or more programs, the at least one memory and the computer code configured, with the at least one processor, to cause the apparatus at least to: send, to a data model repository function, a user equipment identifier and a model identifier.

The at least one memory and the computer code configured, with the at least one processor, to cause the apparatus at least to: upload, to an application function for model uploading service, a model identified by the model identifier; and send, to the data model repository function, a model version identifier, an application function for model uploading service identifier and/or an address of the application function for model uploading service.

The at least one memory and the computer code configured, with the at least one processor, to cause the apparatus at least to: receive, from the data model repository function an application function for model uploading service identifier and/or an address of the application function for model uploading service; and upload, to application function for model uploading service, a model identified by the model identifier.

According to an aspect there is provided an apparatus comprising circuitry configured to: send, to a data model repository function, a user equipment identifier and a model identifier.

The apparatus may comprise circuitry configured to: upload, to an application function for model uploading service, a model identified by the model identifier; and send, to the data model repository function, a model version identifier, an application function for model uploading service identifier and/or an address of the application function for model uploading service.

The apparatus may comprise circuitry configured to: receive, from the data model repository function an application function for model uploading service identifier and/or an address of the application function for model uploading service; and upload, to application function for model uploading service, a model identified by the model identifier.

According to an aspect there is provided a method comprising: sending, to a data model repository function, a user equipment identifier and a model identifier.

The method may comprise: uploading, to an application function for model uploading service, a model identified by the model identifier; and sending, to the data model repository function, a model version identifier, an application function for model uploading service identifier and/or an address of the application function for model uploading service.

The method may comprise: receiving, from the data model repository function an application function for model uploading service identifier and/or an address of the application function for model uploading service; and uploading, to application function for model uploading service, a model identified by the model identifier.

According to an aspect there is provided a computer program comprising computer executable code which when run on at least one processor is configured to: send, to a data model repository function, a user equipment identifier and a model identifier.

The computer program may comprise computer executable code which when run on at least one processor is configured to: upload, to an application function for model uploading service, a model identified by the model identifier; and send, to the data model repository function, a model version identifier, an application function for model uploading service identifier and/or an address of the application function for model uploading service.

The computer program may comprise computer executable code which when run on at least one processor is configured to: receive, from the data model repository function an application function for model uploading service identifier and/or an address of the application function for model uploading service; and upload, to application function for model uploading service, a model identified by the model identifier.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations

AF: Application Function
AI: Artificial Intelligence
AMF: Access and Mobility Management Function
API: Application Programming Interface
BS: Base Station
CU: Centralized Unit
DL Downlink
DU: Distributed Unit
DMRF: Data Model Repository Function
gNB: gNodeB
GSM: Global System for Mobile communication
HSS: Home Subscriber Server
IoT: Internet of Things
LTE: Long Term Evolution
MAC: Medium Access Control
ML: Machine Learning
MS: Mobile Station
MSIN: Mobile Subscriber Identification Number
MTC: Machine Type Communication
NEF: Network Exposure Function
NF Network Function
NR: New radio
NRF: Network Repository Function
NWDAF: Network Data Analytics Function
PDU: Packet Data Unit
RAM: Random Access Memory
(R)AN: (Radio) Access Network
ROM: Read Only Memory
SMF: Session Management Function
SMS: Short Message System
TR: Technical Report
TS: Technical Specification
UDM: Unified Data Management
UDR: Unified Data Repository
UE: User Equipment
UMTS: Universal Mobile Telecommunication System
UPU: UE parameters update 3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 10 shows a block diagram of a method for allowing a user equipment to access a model (e.g. an artificial intelligence or machine learning model) in a communication system performed by a model provider function, for example a network data analytics function.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
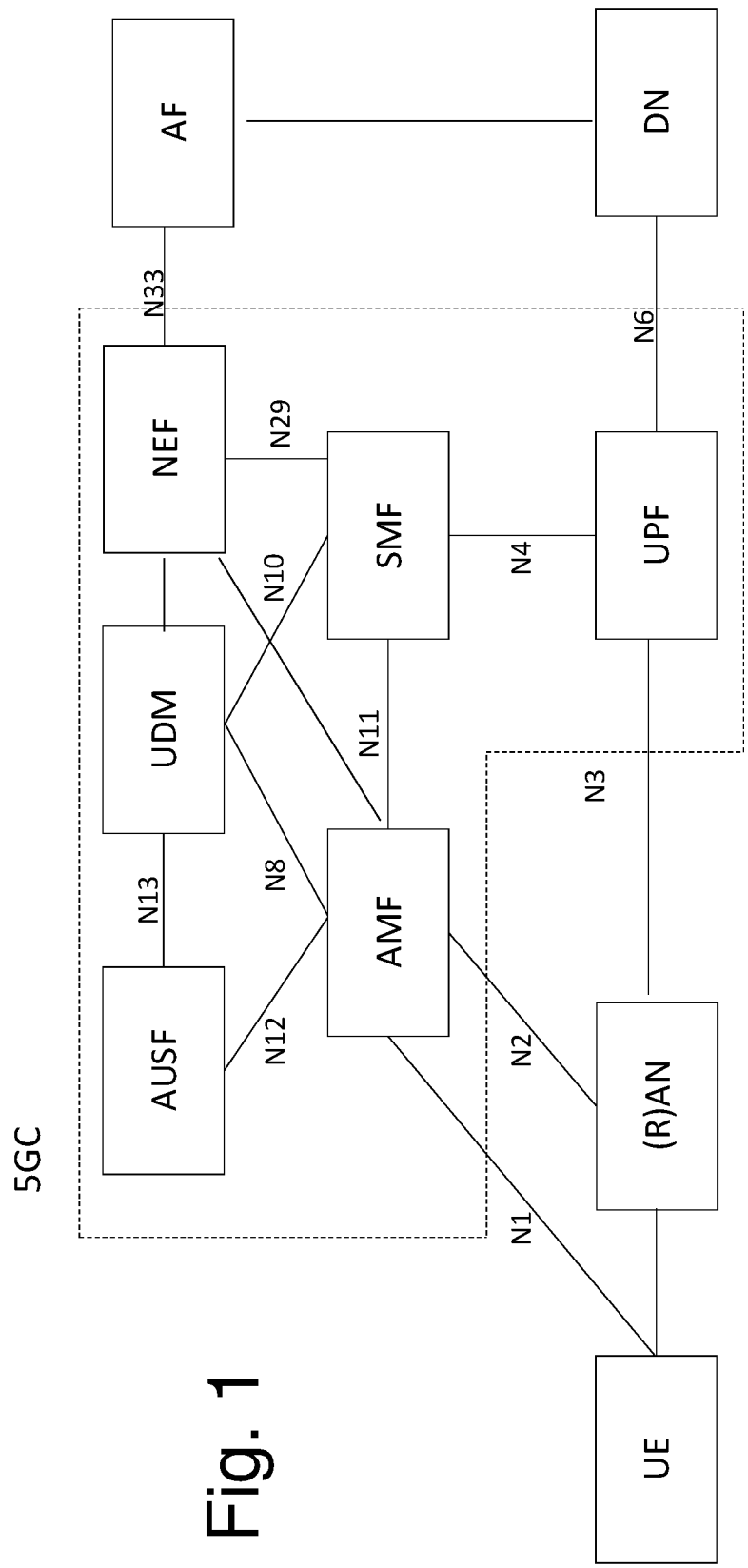
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN). The AF may comprise an AF for model subscription service and an AF for model uploading service.

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

The 5GC may comprise other network functions (NF) such as a unified data repository (UDR), a network data analytics function (NWDAF) and a data model repository function (DMRF).

Figure 2:
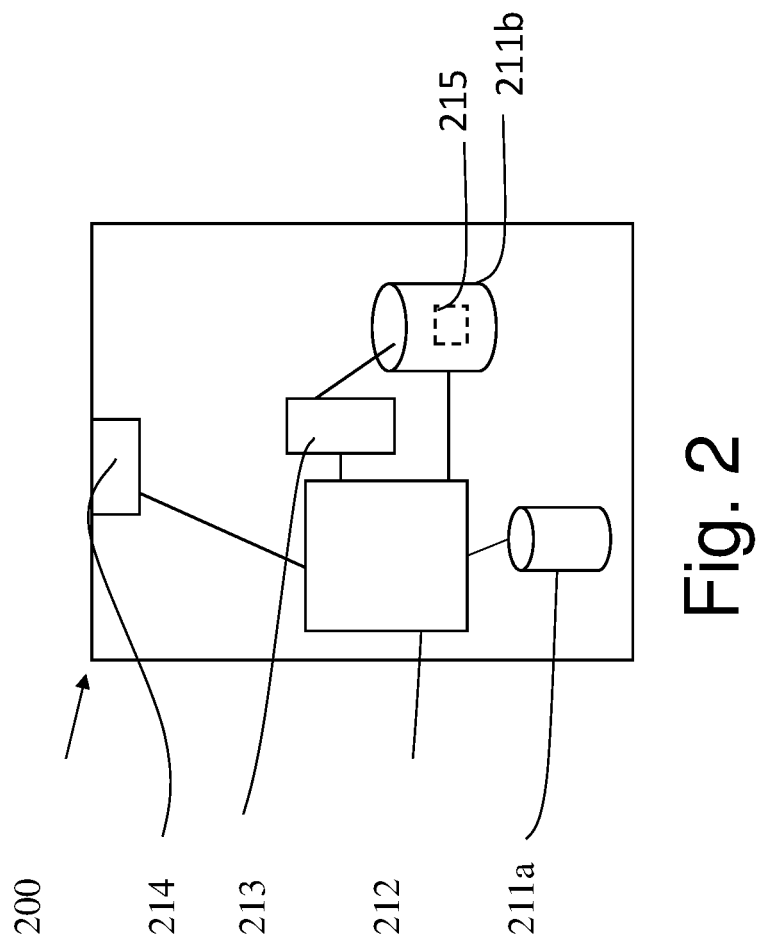
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
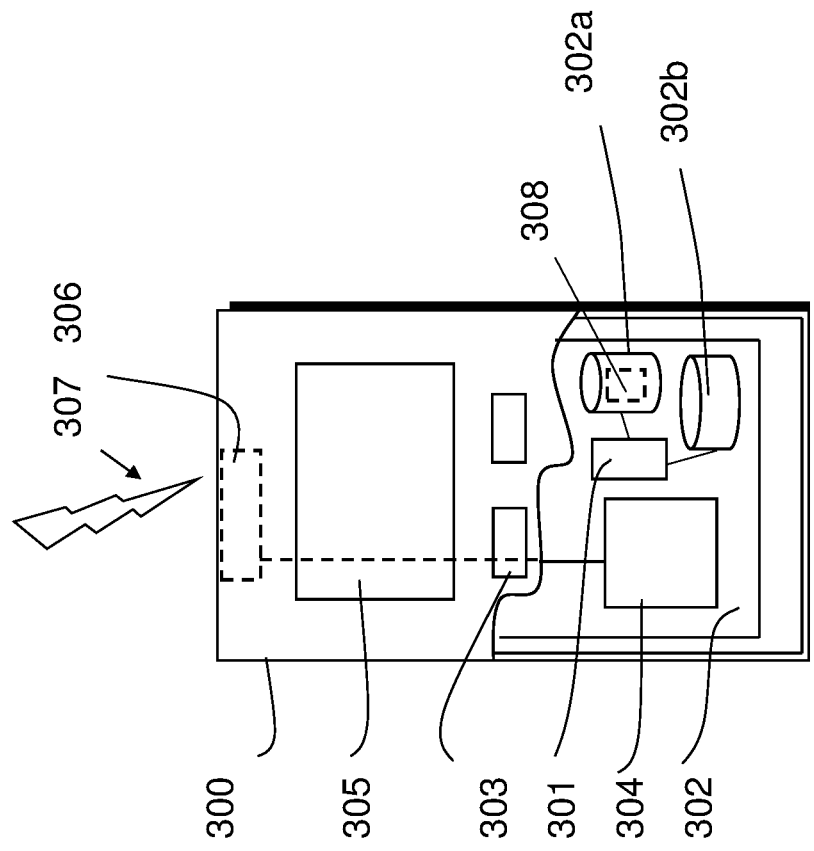
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIOT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more aspect of this disclosure relate to providing access to a model (e.g. machine learning model) to a UE.

A trained artificial intelligence (AI) or machine learning (ML) model, when exposed by a NWDAF, may be shared between different NWDAF instances for the analytics and/or inference. There are use cases envisioned in 5G Release 18+ and 6G that enable a user or a UE to subscribe to analytics and/or inference services from NWDAF. This may require the NWDAF or any analytics function to send the model to the UE in a secured way. The UE may then locally use the model for analytics and/or inference.

A few examples of such use cases are described in 3GPP TR 22.874 ("Study on traffic characteristics and performance requirements for ML model transfer in 5GS (Release 18)"), including split AI or ML image recognition, AI or ML media recognition split control for robots, augmented reality using smart glasses, self-driving cars, etc.

There is currently no standardized mechanism to provide a model from a NWDAF to a UE, let alone a secured mechanism. For example, there is no mechanism to allow the NWDAF to verify that a UE has subscribed and is authorized before providing the model to the UE.

There is currently no standardized mechanism to prevent the UE to subsequently provide the model to another UE that has not subscribed and that is not authorized.

There is currently no standardized NF storing information indicating which UE is using which model and/or which version of the model.

There is currently no standardized NF configured to provide access to a model to the UE based on subscription. There is no NF configured to provide access to an updated model to the UE based on Model version change based on subscription. There is no NF configured to prevent access to a model from a UE based on subscription, on prior experience or NWDAF indication.

One or more aspects of this disclosure address one or more of the above.

One or more aspects of this disclosure provide a data model repository function (DMRF). The DMRF is a new NF. The DMRF may be hosted in a new standalone NF or co-hosted in an existing NF.

The DMRF may receive a UE ID, a model ID, a model version ID and/or a UE subscription status from a NWDAF.

In an implementation, the NWDAF may have already uploaded the model identified by the model ID and/or model version ID to the AF for model uploading service. The NWDAF may provide the address of the AF for model uploading service to the DMRF along the UE ID, the model ID, the model version ID and/or the UE subscription status.

In another implementation, the NWDAF may not have already uploaded the model identified by the model ID and/or model version ID to the AF for model uploading service. The NWDAF may not provide the address of the AF for model uploading service to the DMRF along the UE ID, the model ID, the model version ID and/or the UE subscription status. Instead, the DMRF may determine the address of the AF for model uploading service. The DMRF may provide the address of the AF for model uploading service to the NWDAF. The NWDAF may then upload the model identified by the model ID and/or model version ID to the AF for model uploading service.

The DMRF may store (i.e. map) the UE ID, the model ID, the model version ID, the UE subscription status, the access key, the access key expiry time and/or the address (e.g. uniform resource indicator) of an AF for model uploading service. The DMRF may store a block list of UE.

The access key may be specific for the UE ID, the model ID and/or the model version ID. That is a same access key cannot be stored (i.e. mapped) to different UE IDs, different model IDs and/or different model version IDs.

The access key may be generated by the DMRF. Alternatively, the access key may be generated by the UDM or UDR The DMRF may verify the access key, the UE ID, the model ID and/or the model version ID before allowing the AF for model uploading service to provide a model identified by the model ID and/or model version ID to the UE. In this way, the DMRF may ensure that the model identified by the model ID and/or model version ID is only provided to the UE and used by the UE.

The DMRF may subscribe to receive a notification from the NWDAF indicating that a model update (e.g. new model version identified by a new model version ID) is available at the NWDAF.

The DMRF may receive a notification from the NWDAF indicating that a model update is available at the NWDAF. The DMRF may cause the NWDAF to upload the model update to the AF for model uploading service. The DMRF may cause the AF for model uploading service to provide the model update to the UE.

Figure 4A:
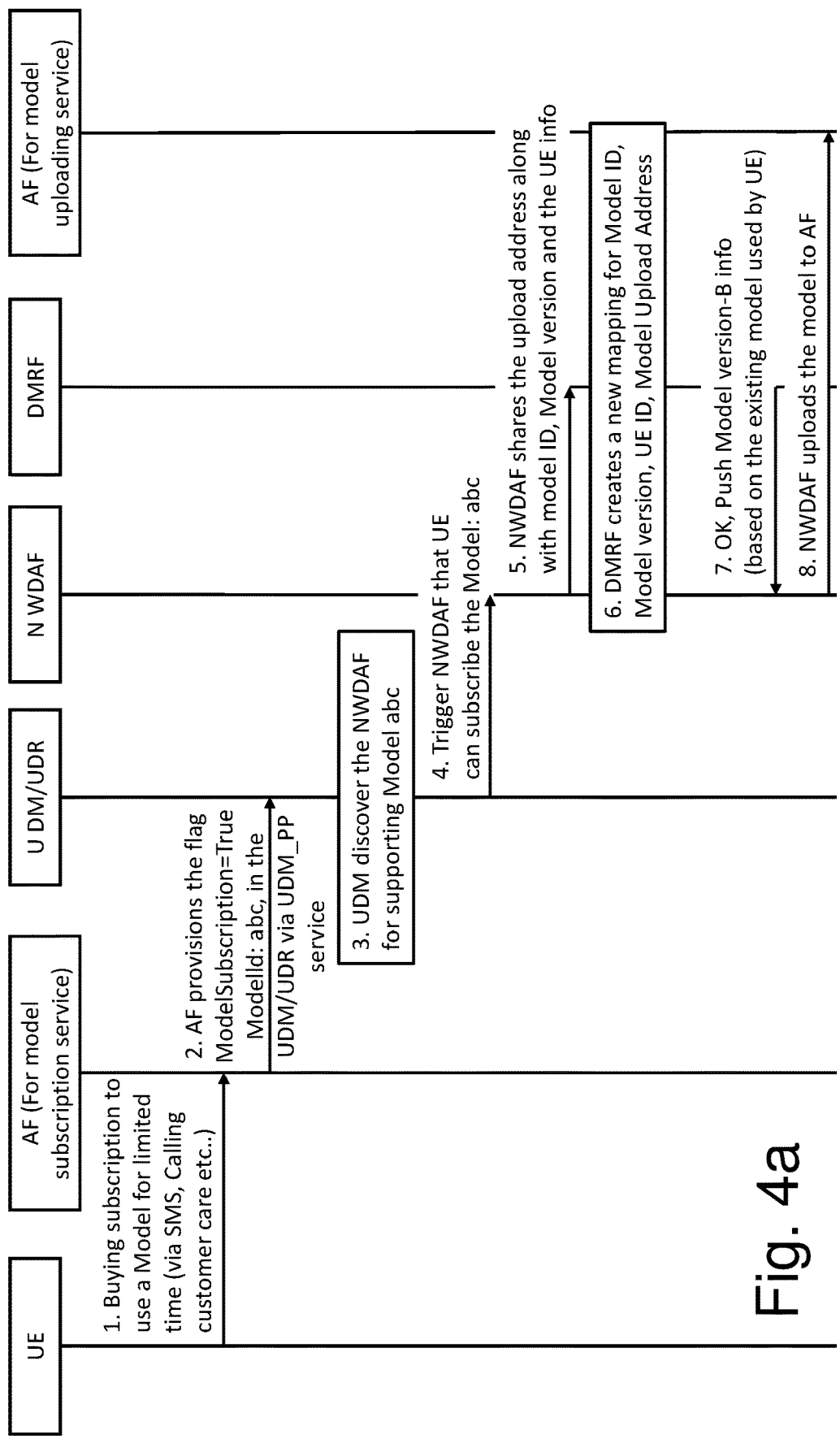
FIGS. 4a and 4b show a signaling diagram of a process for allowing a user equipment to access a model (e.g. an artificial intelligence or machine learning model) in a communication system.
Figure 4B:
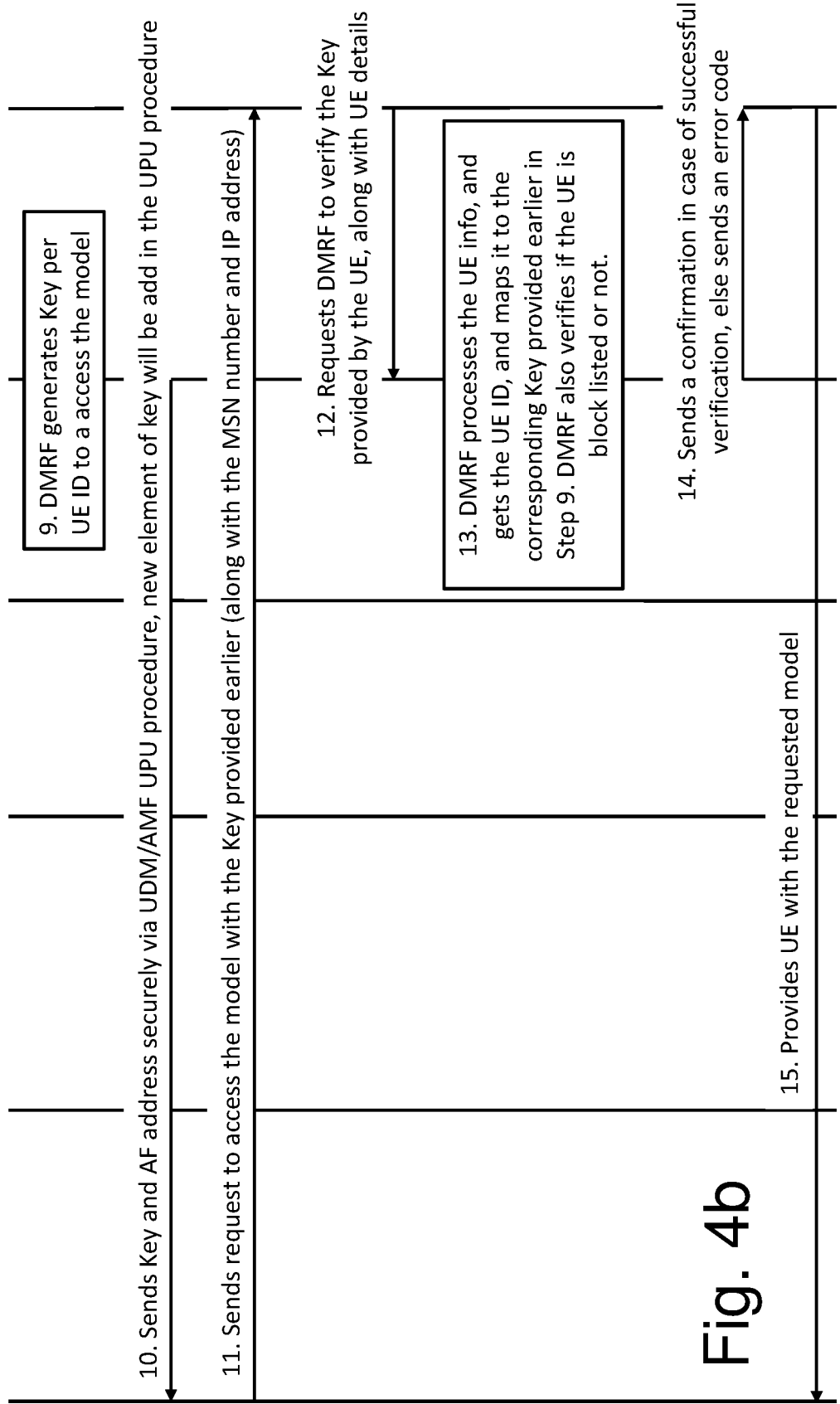

FIGS. 4a and 4b show a signalling diagram of a process for allowing a UE to access a model (e.g. an artificial intelligence or machine learning model) in a communication system performed by a DMRF.

In step 1, a UE may subscribe to use a model. For example, the UE may pay to use the model for a period of time. The UE may send a UE ID, a model ID and/or a model version ID to an AF for model subscription service. The UE may pay to be provided with a model update when available. The UE may send a model update request flag. The UE may send a short message system (SMS) message, call a customer care number or other.

In step 2, the AF for model subscription service may send the UE ID, the model ID, the model version ID and/or the model update flag to a UDM or UDR. The AF for model subscription service may send a subscription status (ModelSubscription=True) to the UDM or UDR. For example, the AF for model subscription service may use a UDM_PP service.

In step 3, the UDM or UDR may store (i.e map) the UE ID, the model ID, the model version ID, the subscription status and/or the model update flag. The UDM or UDR may discover a NWDAF providing the model identified by the model ID and/or the model version ID.

In step 4, the UDM or UDR may send the UE ID, the model ID, the model version ID, the subscription status and/or the model update flag to the NWDAF.

In step 5, the NWDAF may store (i.e map) the UE ID, the model ID, the model version ID, the subscription status and/or the model update flag. The NWDAF may send the UE ID, the model ID, the model version ID, the subscription status and/or the model update flag to the DMRF.

If the NWDAF has already uploaded the model identified by the model ID and/or the model version ID, the NWDAF may send an address of an AF for model uploading service along with the UE ID, the model ID, the model version ID and/or the subscription status.

If the NWDAF has not already uploaded the model identified by the model ID and/or the model version ID, the NWDAF may not send an address of an AF for model uploading service along with the UE ID, the model ID, the model version ID and/or the subscription status.

In step 6, the DMRF may store (i.e map) the UE ID, the model ID, the model version ID, the subscription status and/or the model update flag.

If the DMRF received the address of the AF for model uploading service in step 5, the DMRF may store (i.e map) the address of the AF for model uploading along the UE ID, the model ID, the model version ID and/or the subscription status.

If the DMRF did not receive the address of the AF for model uploading service in step 5, the DMRF may determine the address of the AF for model uploading. The DMRF may store (i.e map) the address of the AF for model uploading along the UE ID, the model ID, the model version ID and/or the subscription status.

The DMRF may store (i.e. map) a blocklist of UE, the model ID and/or the model version ID. The blocklist of UE may be a list of UE prevented from accessing a model.

The DMRF may subscribe to receive a notification when an update (e.g. new model version) is available at the NWDAF for the model identified by the model ID and/or model version ID.

In step 7, the DMRF may send an acknowledgement to the NWDAF. If the DMRF did not receive the address of the AF for model uploading service in step 5 and determined the address of the AF for model uploading in step 6, the DMRF may send the address of the AF for model uploading to the NWDAF.

In step 8, if the DMRF did not receive the address of the AF for model uploading service in step 5, determined the address of the AF for model uploading in step 6, and sent the address of the AF for model uploading to the NWDAF in step 7, the NWDAF may upload the model identified by the model ID and/or model version ID on the AF for model uploading service.

In step 9, the DMRF may generate an access key specific for the UE ID, the model ID and/or model version ID. The DMRF may store (i.e. map) the access key and/or an access key expiry time along the UE ID, the model ID, the model version ID, the UE subscription status the address of the AF for model uploading service and/or the model update flag.

In step 10 the DMRF may send the access key, access key expiry time and/or address of the AF for model uploading service to the UE. The DMRF may send the access key, access key expiry time and/or address of the AF for model uploading service to the UE via UDM or AMF UE parameter update (UPU) procedure. For this purpose, a new element of access key may be added in the UPU procedure. The UPU procedure is defined in TS 33.501.

In step 11, the UE may send a request to the AF for model uploading service to access the model identified by the model ID and/or model version ID. The UE may send the UE ID, the model ID, the model version ID and/or the access key. The UE may send a mobile subscriber identification number (MSIN). The UE may send an internet protocol (IP) address.

In step 12, the AF for model uploading service may send a request to the DMRF to verify the access key and UE ID, as well as the model ID and/or the model version ID.

In step 13, the DMRF may determine whether the UE ID, the model ID, the model version ID and/or the access key are stored along with each other (i.e. mapped) at the DMRF. The DMRF may verify the UE is not part of the blocklist of UE. The DMRF may verify that the access key expiry time has not expired.

If the UE ID, the model ID, the model version ID and/or the access key are stored along with each other (i.e. mapped) at the DMRF, the UE is not part of the blocklist of UE and the access key expiry time has not expired, the verification may be successful.

If the UE ID, the model ID, the model version ID and/or the access key are not stored along with each other (i.e. mapped) at the DMRF, the UE is part of the blocklist of UE or the access key expiry time has expired, the verification may not unsuccessful.

Since the access key may be specific to the UE ID, another UE cannot use it to access the model and/or model version. If another UE identified sends the access key, another UE ID, the model ID and/or the model version ID, the verification at DMRF will be unsuccessful in step 11.

Since the access key may be specific to the model ID and/or model version ID, the UE cannot use it to access another model and/or another model version. If the UE sends the access key, the UE ID, another model ID and/or another model version UD, the verification at DMRF will be unsuccessful in step 11.

In step 14, the DMRF may send an indication to the AF for model uploading service that the verification has been successful or that the verification has been unsuccessful.

If the verification has been unsuccessful due to the access key expiry time being expired, the DMRF may generate a new access key. The DMRF may store the new access key and/or a new access key expiry time along the UE ID, the model ID, the model version ID, the UE subscription status and/or the address of the AF for model uploading service. The DMRF may send the new access key and/or new access key expiry time to the UE. The UE may send a new request to the AF for model uploading service to access the model identified by the model ID and/or model version ID. The UE may send the UE ID, the model ID, the model version ID and/or the new access key.

In step 15, if the verification has been successful, the AF for model uploading service may send the model identified by the model ID and/or model version to the UE. The UE may use the model until the access key expiry time expires.

The DMRF may receive a notification from the NWDAF indicating that a model update is available at the NWDAF. If the UE subscription has not expired and the UE subscription status has not changed (e.g. ModelSubscription=True), then the DMRF may cause the NWDAF to upload the model update to the AF for model uploading service. DMRF may cause the AF for model uploading service to provide the model update to the UE.

If the UE subscription expires and the UE subscription status changes (e.g. ModelSubscription=False), if the access key expiry time or if the UE is moved to blocklist of UE, then the UE is caused to stop using the model.

For example, if the UE subscription expires and the UE status changes (e.g. ModelSubscription=False) the UDM or UDR may send a notification to the NWDAF and/or the DMRF. The DMRF may mark the UE accordingly and no further model updates (e.g. new model version) should be provided to the UE. The DMRF may send a notification to the AMF. The AMD may instruct the UE to stop using the model. The UE may mark the model as invalid and delete it.

It will be understood that although a network control approach has been described above, a UE control approach may be contemplated as well.

Figure 5:
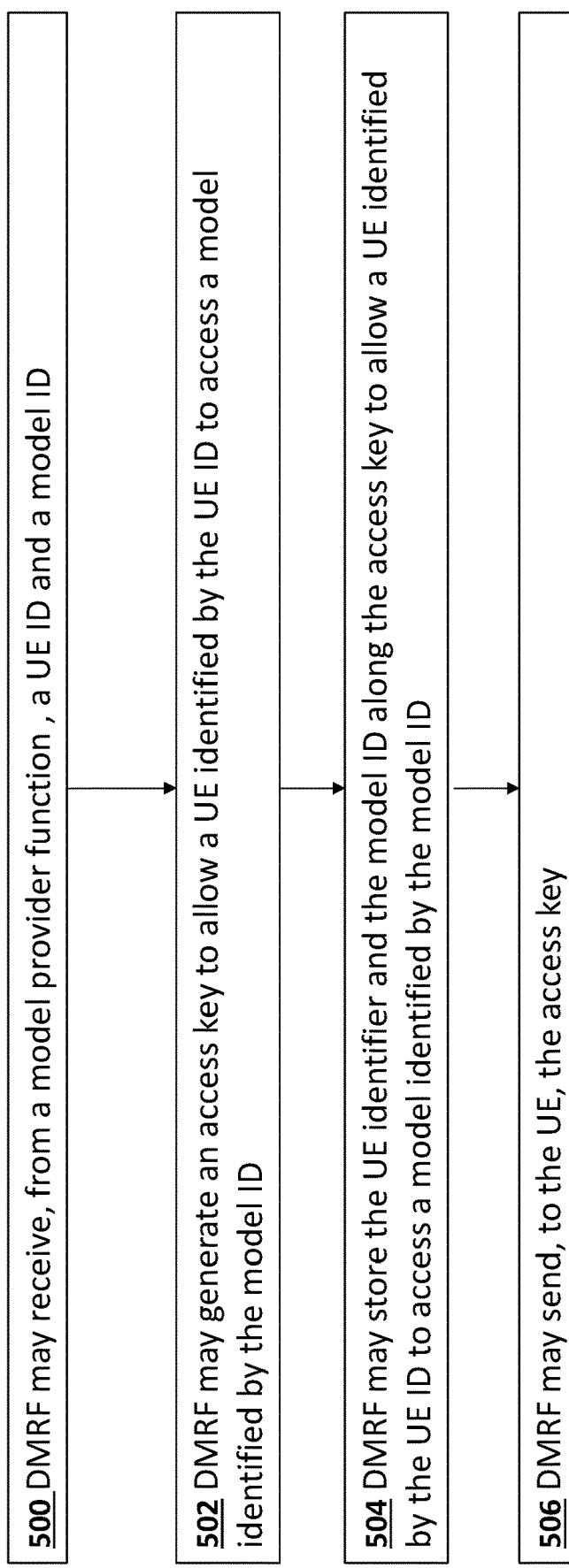
FIG. 5 shows a block diagram of a method for allowing a user equipment to access a model (e.g. an artificial intelligence or machine learning model) in a communication system performed by a data model repository function.

FIG. 5 shows a block diagram of a method for allowing a UE to access a model (e.g. an artificial intelligence or machine learning model) in a communication system performed by a DMRF.

In step 500, a DMRF may receive, from a model provider function (e.g. NWDAF), a UE ID and a model ID.

In step 502, the DMRF may generate an access key to allow a UE identified by the UE ID to access a model identified by the model ID.

In step 504, the DMRF may store the UE ID and the model ID along the access key to allow a UE identified by the UE ID to access a model identified by the model ID.

In step 506, the DMRF may send, to the UE, the access key.

The DMRF may store the UE ID and the model ID further along at least one of an access key expiry time, a model version ID, a UE subscription status, an AF for model uploading service ID or an address of an AF for model uploading service.

The DMRF may receive, from the model provider function, the model version ID.

The DMRF may receive, from the model provider function, the AF for model uploading service ID and/or the address of the AF for model uploading service.

The DMRF may determine the AF for model uploading service ID and/or the address of the AF for model uploading service. The DMRF may send, to the model provider function, the AF for model uploading service ID and/or the address of the AF for model uploading service.

The DMRF may send, to the UE, the AF for model uploading service ID and/or the address of the AF for model uploading service.

The DMRF may send, to the model provider function, a request to be notified when a model update is available at the model provider function. The DMRF may receive, from the model provider function, a notification when a model update is available at the model provider function. The DMRF may send, to the model provider function, a request to upload the model update to the AF for model uploading service.

The DMRF may store a blocklist of UE.

The DMRF may receive, from the AF for model uploading service, a request to verify a UE ID, a model ID and an access key. The DMRF may verify that the UE ID and the model ID are stored along the access key, that the UE ID is not part of the blocklist of UE and/or that the access key expiry time has not expired. The DMRF may send, to the AF for model uploading service, an indication of successful verification or unsuccessful verification.

Figure 6:
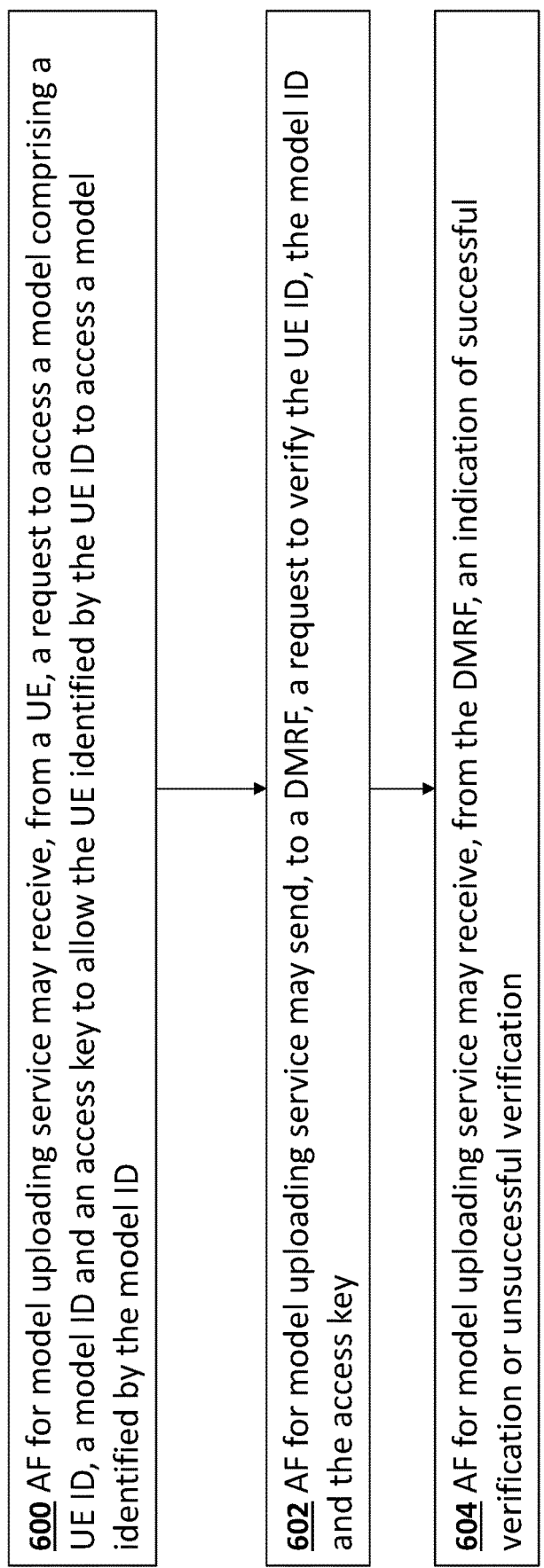
FIG. 6 shows a block diagram of a method for allowing a user equipment to access a model (e.g. an artificial intelligence or machine learning model) in a communication system performed by an application function for model uploading service.

FIG. 6 shows a block diagram of a method for allowing a UE to access a model (e.g. an artificial intelligence or machine learning model) in a communication system performed by an AF for model uploading service.

In step 600, an AF for model uploading service may receive, from a UE, a request to access a model comprising a UE ID, a model ID and an access key to allow the UE identified by the UE ID to access a model identified by the model ID.

In step 602, the AF for model uploading service may send, to a DMRF, a request to verify the UE ID, the model ID and the access key.

In step 604, the AF for model uploading service may receive, from the DMRF, an indication of successful verification or unsuccessful verification.

The AF for model uploading service may receive, from the DMRF, an indication of successful verification. The AF for model uploading service may send, to the UE, the model.

Figure 7:
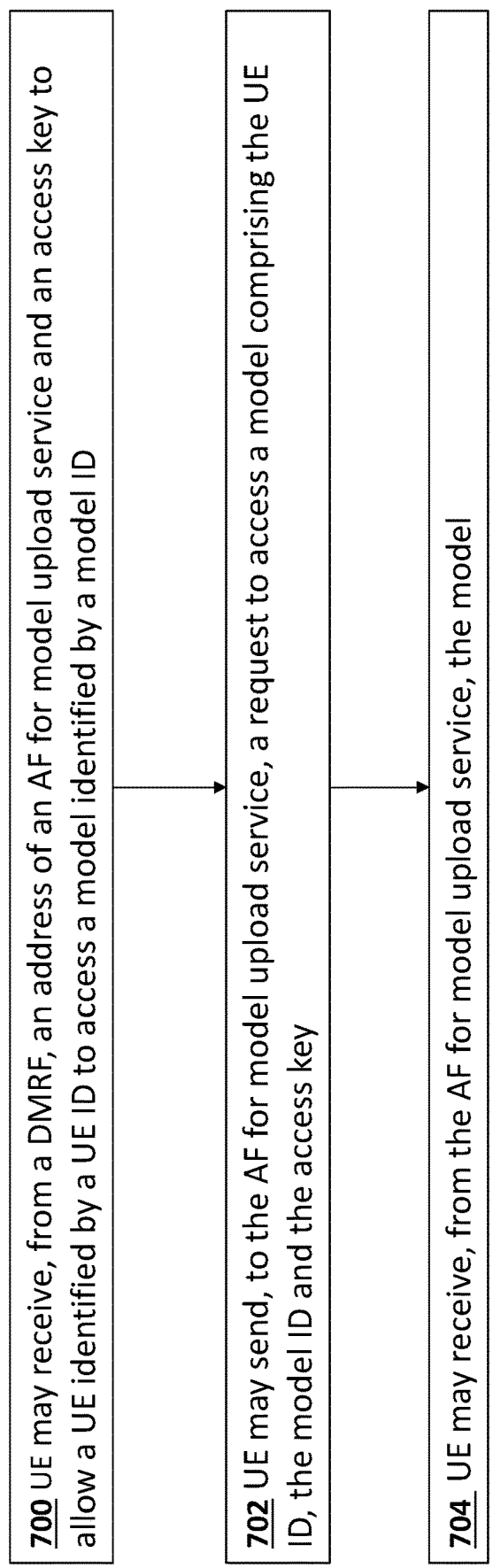
FIG. 7 shows a block diagram of a method for allowing a user equipment to access a model (e.g. an artificial intelligence or machine learning model) in a communication system performed by a user equipment.

FIG. 7 shows a block diagram of a method for allowing a UE to access a model (e.g. an artificial intelligence or machine learning model) in a communication system performed by the UE.

In step 700, a UE may receive, from a DMRF, an address of an AF for model uploading service and an access key to allow a UE identified by a UE ID to access a model identified by a model ID.

In step 702, the UE may send, to the AF for model uploading service, a request to access a model comprising the UE ID, the model ID and the access key.

In step 704, the UE may receive, from the AF for model uploading service, the model.

The UE may send, to an AF for model subscription service, a request to obtain a subscription to access the model comprising the UE ID and the model ID.

Figure 8:
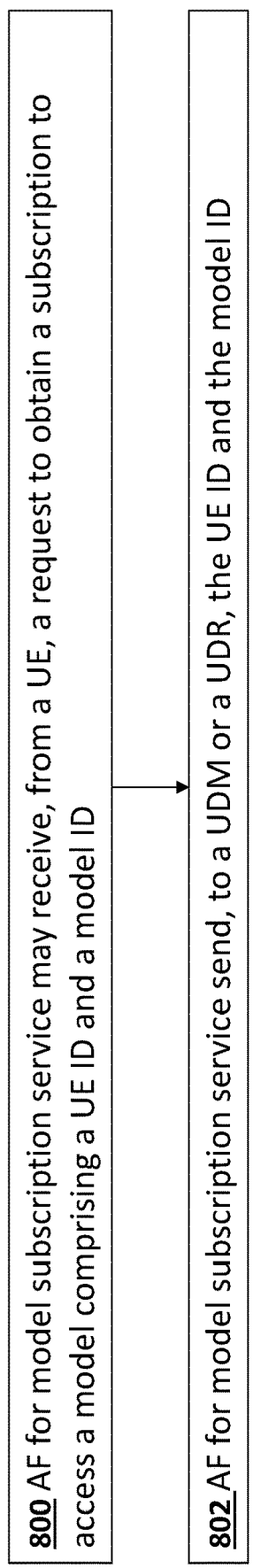
FIG. 8 shows a block diagram of a method for allowing a user equipment to access a model (e.g. an artificial intelligence or machine learning model) in a communication system performed by an application function for model subscription service.

FIG. 8 shows a block diagram of a method for allowing a UE to access a model (e.g. an artificial intelligence or machine learning model) in a communication system performed by an AF for model subscription service.

In step 800, the AF for model subscription service may receive, from a UE, a request to obtain a subscription to access a model comprising a UE ID and a model ID.

In step 802, the AF for model subscription service may send, to a UDM or UDM, the UE ID and the model ID.

Figure 9:
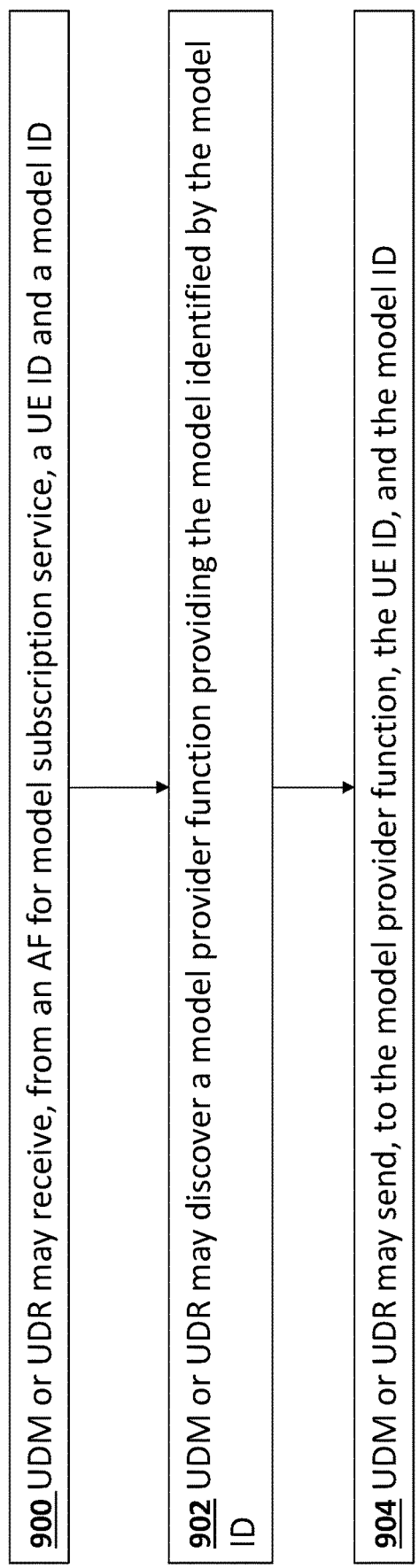
FIG. 9 shows a block diagram of a method for allowing a user equipment to access a model (e.g. an artificial intelligence or machine learning model) in a communication system performed by a unified data management or a unified data repository.

FIG. 9 shows a block diagram of a method for allowing a UE to access a model (e.g. an artificial intelligence or machine learning model) in a communication system performed by a UDM or UDR.

In step 902, a UDM or UDR may receive, from an AF for model subscription service, a UE ID and a model ID.

In step 904, the UDM or UDR may discover a model provider function providing the model identified by the model ID.

In step 906, the UDM or UDR may send, to the model provider function, the UE ID and the model ID.

FIG. 10 shows a block diagram of a method for allowing a UE to access a model (e.g. an artificial intelligence or machine learning model) in a communication system performed by a model provider function (e.g. NWDAF)

In step 1000, the model provider function may send, to a DMRF, a UE ID and a model ID.

The model provider function may upload, to an AF for model uploading service, a model identified by the model ID. The model provider function may send, to the DMRF, a model version ID, an AF for model uploading service ID and/or an address of the AF for model uploading service.

The model provider function may receive, from the DMRF an application function for model uploading service ID and/or an address of the AF for model uploading service. The model provider function may upload, to the AF for model uploading service, a model identified by the model ID.

Figure 11:
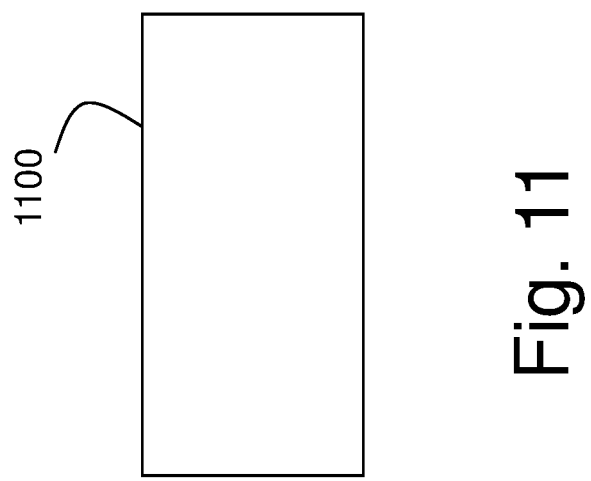
FIG. 11 shows a schematic representation of a non-volatile memory medium storing instructions which when executed by a processor allow a processor to perform one or more of the steps of the methods of FIGS. 5 to 10.

FIG. 11 shows a schematic representation of non-volatile memory media 1100 storing instructions and/or parameters which when executed by a processor allow the processor to perform one or more of the steps of the methods of FIGS. 5 to 10.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 5 to 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
 (i) a combination of analogue and/or digital hardware circuit(s) with software/firmware and
 (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus comprising:
   at least one processor; and
   at least one memory including computer code for one or more programs, the at least one memory and the computer code being configured to, with the at least one processor, cause the apparatus at least to:
   receive, from a model provider function, a first user equipment identifier, a first model identifier, and a first model version identifier associated with a subscription status of the first user equipment;
   generate a first access key, wherein the first access key is specific to a combination of the first user equipment identifier, the first model identifier, and the first model version identifier;
   store, in a data record, a plurality of entries, wherein each entry of the plurality of entries comprises the first user equipment identifier, the first model identifier, the first model version identifier, the first access key, an access key expiry time, and the subscription status;
   store, in the memory, a block list comprising one or more user equipment identifiers prevented from accessing a model;
   send, to a user equipment identified by the first user equipment identifier, the first access key, the access key expiry time, and an address of an application function for model uploading service via a user parameter update procedure;
   receive, from the application function for model uploading service, a verification request comprising a second user equipment identifier, a second model version identifier, a second model identifier, and a second access key;
   verify, the verification request by:
      confirming the second user equipment identifier is absent from the block list; and
      identifying an entry in the data record, based on:
         the first user equipment identifier matching the second user equipment identifier,
         the first model identifier matching the second model identifier, and the first access key matching the second access key, and
         the access key expiry time of the identified entry has not expired; and
   send, to the application function for model uploading service, a verification response message comprising an indication of either successful verification or unsuccessful verification based on a result of verifying the verification request.

2. The apparatus of claim 1, wherein the at least one memory and the computer code are configured to, with the at least one processor, cause the apparatus at least to:
   send, to the model provider function, a request to be notified when a model update is available at the model provider function;
   receive, from the model provider function, a notification when a model update is available at the model provider function; and
   send, to the model provider function, a request to upload the model update to the application function for model uploading service.

3. A system comprising:
   a user equipment;
   a first apparatus configured to operate as an application function;
   a second apparatus configured to operate as a network function;
   a processor; and
   a memory comprising computer-executable instructions that, when executed by the processor, cause the processor to perform the following operations:
   receive, for the user equipment, a first user equipment identifier, a first model identifier, and a first model version identifier associated with a subscription status;
   generate a first access key, wherein the first access key is specific to a combination of the first user equipment identifier, the first model identifier, and the model version identifier;
   store, in a data record in the memory, a plurality of entries, wherein each entry of the plurality of entries comprises the first user equipment identifier, the first model identifier, the first model version identifier, the first access key, an access key expiry time, and the subscription status;
   store, in the memory, a block list comprising one or more user equipment identifiers prevented from accessing a model;
   send, to the user equipment identified by the first user equipment identifier, the first access key, the access key expiry time, and an address of an application function for model uploading service via a user parameter update procedure;
   receive, from the application function for model uploading service, a verification request comprising a second user equipment identifier, a second model version identifier, a second model identifier, and a second access key;
   verify, the verification request by:
      confirming the second user equipment identifier is absent from the block list; and
      identifying an entry in the data record, based on:
         the first user equipment identifier matching the second user equipment identifier,
         the first model identifier matching the second model identifier, and the first access key matching the second access key, and
         the access key expiry time of the identified entry has not expired; and
   send, to the application function for model uploading service, a verification response message comprising an indication of either successful verification or unsuccessful verification based on a result of verifying the verification request.

\* \* \* \* \*